(12) United States Patent
Jasionowski et al.

(10) Patent No.: US 11,601,347 B2
(45) Date of Patent: Mar. 7, 2023

(54) IDENTIFICATION OF INCIDENT REQUIRED RESOLUTION TIME

(71) Applicant: Kyndryl, Inc., Armonk, NY (US)

(72) Inventors: Pawel Jasionowski, Wroclaw (PL); Steven J Mazzuca, New Paltz, NY (US); Daniel S. Riley, Wake Forest, NC (US); Michael H. Roehl, New Fairfield, CT (US); George E. Stark, Lakeway, TX (US); Daniel Grey Yates, Columbia, MO (US)

(73) Assignee: Kyndryl, Inc., New York, NY (US)

( * ) Notice: Subject to any disclaimer, the term of this patent is extended or adjusted under 35 U.S.C. 154(b) by 83 days.

(21) Appl. No.: 16/944,198

(22) Filed: Jul. 31, 2020

(65) Prior Publication Data

US 2022/0038351 A1 Feb. 3, 2022

(51) Int. Cl.
*H04L 41/5074* (2022.01)
*G06N 20/00* (2019.01)
*H04L 41/5019* (2022.01)
*G06Q 10/0639* (2023.01)
*G06Q 10/0633* (2023.01)

(52) U.S. Cl.
CPC ........ *H04L 41/5074* (2013.01); *G06N 20/00* (2019.01); *G06Q 10/0633* (2013.01); *G06Q 10/06393* (2013.01); *G06Q 10/06398* (2013.01); *H04L 41/5019* (2013.01)

(58) Field of Classification Search
CPC . H04L 41/5019; H04L 41/5074; G06N 20/00; G06Q 10/0633; G06Q 10/06393; G06Q 10/06398
See application file for complete search history.

(56) References Cited

U.S. PATENT DOCUMENTS 9,189,543 B2   11/2015   Badhe
9,369,481 B2    6/2016   Howes
10,437,660 B2  10/2019   Bikumala
(Continued)

OTHER PUBLICATIONS

Guven et al., "Towards establishing causality between Change and Incident", In IEEE/IFIP NOMS, Turkey, 2016, p. 1-6.
Microsoft,"Applying the power of Azure Machine Learning to improve SAP incident management", Microsoft IT Showcase, Pub. Date May 31, 2018, p. 1-8.
(Continued)

*Primary Examiner* — Thomas J Dailey
(74) *Attorney, Agent, or Firm* — Erik Swanson, Esq.; Kevin P. Radigan, Esq.; Heslin Rothenberg Farley & Mesiti P.C.

(57) ABSTRACT

A system to provide end users with recommendations on improving the quality of the incident management process is provided. A computer device identifies a set of historical incident reports, wherein the historical incident reports identify: (i) incident tickets, (ii) one or more skills associated with personnel assigned to the incident tickets, and (iii) whether the incident tickets were resolved within threshold periods of time to resolve. The computing device trains a machine learning model to predict sets of skills associated with resolving incident tickets within the threshold periods of time to resolve based, at least in part, on the identified set of historical incident reports. The computing device assigns a set of personnel to the new incident ticket based, at least in part, on the predicted set of skills associated with resolving the new incident ticket within the threshold period of time to resolve.

17 Claims, 6 Drawing Sheets

(56) References Cited

U.S. PATENT DOCUMENTS

| | | |
|---|---|---|
| 2007/0294406 A1 | 12/2007 | Suer |
| 2009/0125432 A1* | 5/2009 | Deshpande ............ G06Q 10/06 705/37 |
| 2013/0111488 A1* | 5/2013 | Gatti ...................... G06N 20/00 718/103 |
| 2014/0023185 A1* | 1/2014 | Appel ................. H04M 3/5238 379/243 |
| 2014/0136260 A1 | 5/2014 | Dasgupta |
| 2014/0188538 A1* | 7/2014 | Dasgupta ....... G06Q 10/063112 705/7.14 |
| 2014/0244333 A1 | 8/2014 | Bournas |
| 2014/0351416 A1 | 11/2014 | Santos Andrade |
| 2015/0262106 A1 | 9/2015 | Diao |
| 2019/0130310 A1 | 5/2019 | Madhava Rao |
| 2019/0266537 A1 | 8/2019 | Kleehammer |
| 2019/0378073 A1 | 12/2019 | Lopez |

OTHER PUBLICATIONS

Peng et al, "An incident information management framework based on data integration, data mining, and multi-criteria decision making", Decision Support Systems 51 (2011) 316-327, 10.1016/j.dss 2010.11.025.

Silva et al, "Machine learning in incident categorization automation", IEEE Published in 2018 13th Iberian Conf. on Information Systems and Technologies (CISTI) Jun. 13-16, 2018, p. 1-8.

Zografos et al, "A real-time decision support system for roadway network incident response logistics". Transportation Research Part C: Emerging Technologies, (2002) 10, 1-18, 10,1016/S0968-090X(00)00043-7, pp. 1-18.

Mell et al., "The NIST Definition of Cloud Computing", Recommendations of the National Institute of Standards and Technology, NIST Special Publication 800-145, Sep. 2011, 7 pages.

* cited by examiner

IDENTIFICATION OF INCIDENT REQUIRED RESOLUTION TIME

BACKGROUND OF THE INVENTION

The present invention relates generally to the field of incident response, and more particularly to the use of machine learning in the field of incident response.

Generally, incident management includes receiving an identified issue from an end user, a device, or through a monitoring system, and assigning each received incident a level of severity that correlates with an expected resolution time.

SUMMARY

Embodiments of the present invention provide a method, system, and program product to provide end users with recommendations on improving the quality of the incident management process.

A first embodiment encompasses a method to provide end users with recommendations on improving the quality of the incident management process. One or more processors identify a set of historical incident reports, wherein the historical incident reports identify: (i) incident tickets, (ii) one or more skills associated with personnel assigned to the incident tickets, and (iii) whether the incident tickets were resolved within threshold periods of time to resolve. One or more processors train a machine learning model to predict sets of skills associated with resolving incident tickets within the threshold periods of time to resolve based, at least in part, on the identified set of historical incident reports. One or more processors predict using the trained machine learning model, a set of skills associated with resolving a new incident ticket within a threshold period of time to resolve. One or more processors assign a set of personnel to the new incident ticket based, at least in part, on the predicted set of skills associated with resolving the new incident ticket within the threshold period of time to resolve.

A second embodiment encompasses a computer program product to provide end users with recommendations on improving the quality of the incident management process. The computer program product includes one or more computer readable storage media and program instructions stored on the one or more computer-readable storage media. The program instructions include program instructions to identify a set of historical incident reports, wherein the historical incident reports identify: (i) incident tickets, (ii) one or more skills associated with personnel assigned to the incident tickets, and (iii) whether the incident tickets were resolved within threshold periods of time to resolve. The program instructions include program instructions to train a machine learning model to predict sets of skills associated with resolving incident tickets within the threshold periods of time to resolve based, at least in part, on the identified set of historical incident reports. The program instructions include program instructions to predict, using the trained machine learning model, a set of skills associated with resolving a new incident ticket within a threshold period of time to resolve. The program instructions include program instructions to assign a set of personnel to the new incident ticket based, at least in part, on the predicted set of skills associated with resolving the new incident ticket within the threshold period of time to resolve.

A third embodiment encompasses a computer system to provide end users with recommendations on improving the quality of the incident management process. The computer system includes one or more computer processors, one or more computer-readable storage media, and program instructions stored on the computer-readable storage media for execution by at least one of the one or more processors. The program instructions include program instructions to identify a set of historical incident reports, wherein the historical incident reports identify: (i) incident tickets, (ii) one or more skills associated with personnel assigned to the incident tickets, and (iii) whether the incident tickets were resolved within threshold periods of time to resolve. The program instructions include program instructions to train a machine learning model to predict sets of skills associated with resolving incident tickets within the threshold periods of time to resolve based, at least in part, on the identified set of historical incident reports. The program instructions include program instructions to predict, using the trained machine learning model, a set of skills associated with resolving a new incident ticket within a threshold period of time to resolve. The program instructions include program instructions to assign a set of personnel to the new incident ticket based, at least in part, on the predicted set of skills associated with resolving the new incident ticket within the threshold period of time to resolve.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
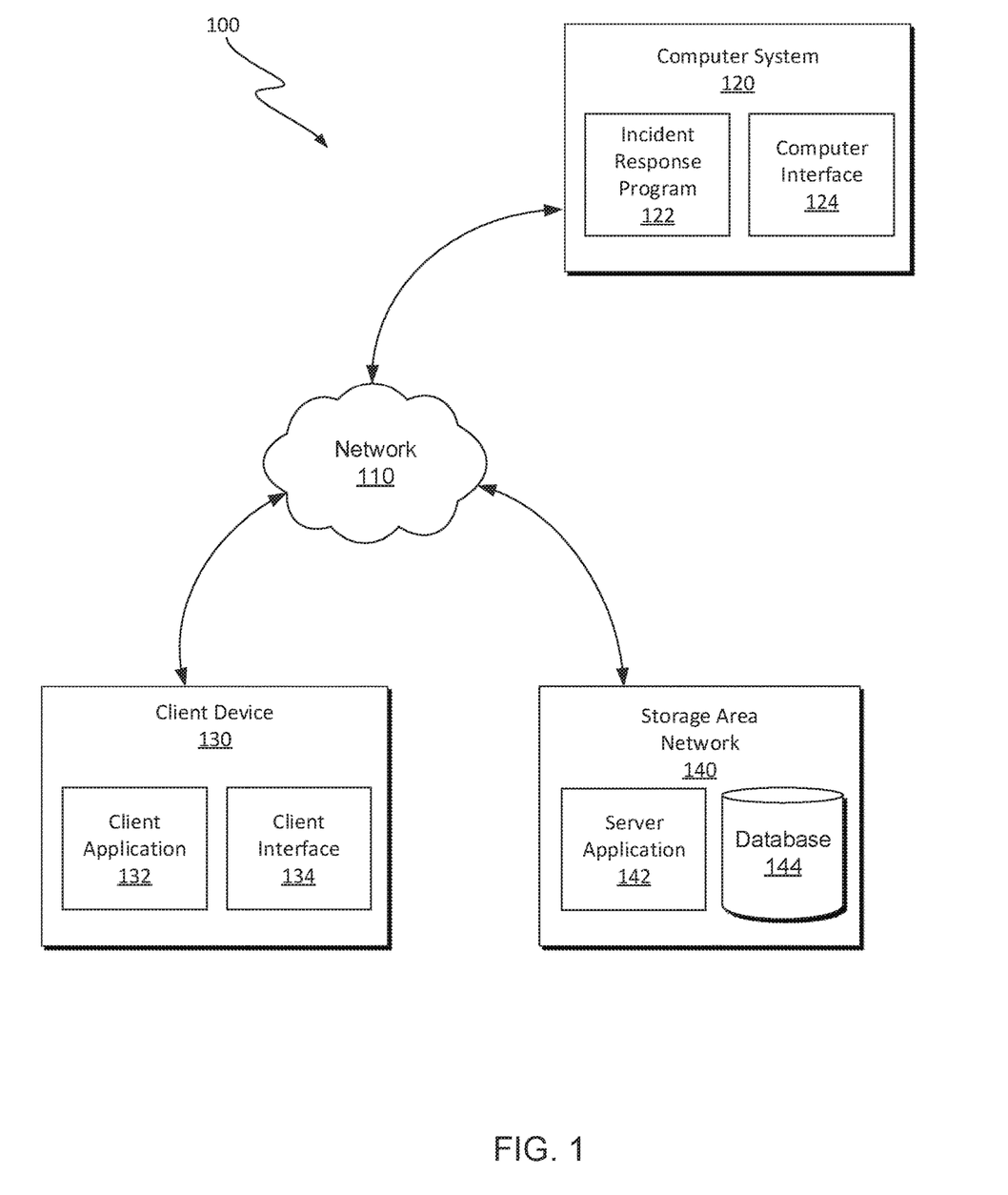
FIG. 1 is a functional block diagram illustrating a computing environment, in which a computing device normalizes incident tickets and identifies a set of personnel and skillsets, accordance with an exemplary embodiment of the present invention.

FIG. 1 is a functional block diagram illustrating computing environment, generally designated 100, in accordance with one embodiment of the present invention. Computing environment 100 includes computer system 120, client device 130, and storage area network (SAN) 140 connected over network 110. Computer system 120 includes incident response program 122 and computer interface 124. Client device includes client application 132 and client interface 134. Storage area network (SAN) 140 includes server application 142 and database 144.

In various embodiment of the present invention, computer system 120 is a computing device that can be a standalone device, a server, a laptop computer, a tablet computer, a netbook computer, a personal computer (PC), a personal digital assistant (PDA), a desktop computer, or any programmable electronic device capable of receiving, sending, and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing incident response program 122 and computer interface 124. Computer system 120 may include internal and external hardware components, as described in further detail with respect to FIG. 6.

In this exemplary embodiment, incident response program 122 and computer interface 124 are stored on computer system 120. However, in other embodiments, incident response program 122 and computer interface 124 are stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120, client device 130, and SAN 140, and various other computer systems (not shown), in accordance with desired embodiment of the present invention.

In various embodiments of the present invention, the various other computer systems (not shown) can be a standalone device, a server, a laptop computer, a tablet computer, a netbook computer, a personal computer (PC), a desktop computer, or any programmable electronic device capable of receiving, sending, and processing data. In another embodiment, the various other computer system represents a computing system utilizing clustered computers and components to act as a single pool of seamless resources. In general, the various other computer system can be any computing device or combination of devices with access to computer system 120, client device 130, SAN 140, and network 110 and is capable of executing incident response program 122 and computer interface 124. The various other computer systems may include internal and external hardware components as depicted and described in further detail with respect to FIG. 6.

In the embodiment depicted in FIG. 1, incident response program 122, at least in part, has access to client application 132 and can communicate data stored on computer system 120 to client device 130, SAN 140, and various other computer systems (not shown). More specifically, incident response program 122 defines a user of computer system 120 that has access to data stored on client device 130 and/or database 144.

Incident response program 122 is depicted in FIG. 1 for illustrative simplicity. In various embodiments of the present invention, incident response program 122 represents logical operations executing on computer system 120, where computer interface 124 manages the ability to view these logical operations that are managed and executed in accordance with incident response program 122. In some embodiments, incident response program 122 represents a cognitive AI system that processes and analyzes input and output (I/O). Additionally, incident response program 122, when executing cognitive AI processing, operates to learn from the I/O that was analyzed and generates an incident resolution report based on, but is not limited to, a normalized incident profile chart (NIPC).

Computer system 120 includes computer interface 124. Computer interface 124 provides an interface between computer system 120, client device 130, and SAN 140. In some embodiments, computer interface 124 can be a graphical user interface (GUI) or a web user interface (WUI) and can display text, documents, web browsers, windows, user options, applications interfaces, and instructions for operation, and includes the information (such as graphic, text, and sound) that a program presents to a user and the control sequences the user employs to control the program. In some embodiments, computer system 120 accesses data communicated from client device 130 and/or SAN 140 via a client-based application that runs on computer system 120. For example, computer system 120 includes mobile application software that provides an interface between computer system 120, client device 130, and SAN 140.

In various embodiments, client device 130 is a computing device that can be a standalone device, a server, a laptop computer, a tablet computer, a netbook computer, a personal computer (PC), a personal digital assistant (PDA), a desktop computer, or any programmable electronic device capable of receiving, sending and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing client application 132 and computer interface 134. Client device 130 may include internal and external hardware components, as described in further detail with respect to FIG. 6.

Client application 132 is depicted in FIG. 1 for illustrative simplicity. In various embodiments of the present invention client application 132 represents logical operations executing on client device 130, where client interface 134 manages the ability to view these logical operations that are managed and executed in accordance with client application 132. In various embodiments, client application 132 defines a user of client device 130 that has access to data stored on computer system 120 and/or database 144.

Storage area network (SAN) 140 is a storage system that includes server application 142 and database 144. SAN 140 may include one or more, but is not limited to, computing devices, servers, server-clusters, web-servers, databases and storage devices. SAN 140 operates to communicate with computer system 120, client device 130, and various other computing devices (not shown) over a network, such as network 110. For example, SAN 140 communicates with incident response program 122 to transfer data between computer system 120, client device 130, and various other computing devices (not shown) that are connected to network 110. SAN 140 can be any computing device or a combination of devices that are communicatively connected to a local IoT network, i.e., a network comprised of various computing devices including, but are not limited to computer system 120 and client device 130 to provide the functionality described herein. SAN 140 can include internal and external hardware components as described with respect to FIG. 6. The present invention recognizes that FIG. 1 may include any number of computing devices, servers, databases, and/or storage devices, and the present invention is not limited to only what is depicted in FIG. 1. As such, in some embodiments, some or all of the features and functions of SAN 140 are included as part of computer system 120, client device 130 and/or another computing device. Similarly, in some embodiments, some of the features of computer system 120 are included as part of SAN 140 and/or another computing device.

Additionally, in some embodiments, SAN 140 and computer system 120 represent, or are part of, a cloud computing platform. Cloud computing is model or service delivery for enabling convenient, on demand network access to a shared pool of configurable computing resources (e.g., networks, network bandwidth, servers, processing, memory, storage, applications, virtual machines, and service(s) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model, and ca be implemented as various deployment models as a private cloud, a community cloud, a public cloud, and a hybrid cloud.

SAN 140 and computer system 120 are depicted in FIG. 1 for illustrative simplicity. However, it is to be understood that, in various embodiments, SAN 140 and computer system 120 can include any number of databases that are managed in accordance with the functionality of incident response program 122 and server application 142. In general, database 144 represents data and server application 142 represents code that provides an ability to use and modify the data. In an alternative embodiment, incident response program 122 can also represent any combination of the aforementioned features, in which server application 142 has access to database 144. To illustrate various aspects of the present invention, examples of server application 142 are presented in which incident response program 122 represents one or more of, but is not limited to, incident monitoring system.

In some embodiments, server application 142 and database 144 are stored on SAN 140. However, in various embodiments, server application 142 and database 144 may be stored externally and accessed through a communication network, such as network 110, as discussed above.

Incident response program 122 is depicted in FIG. 1 for illustrative simplicity, computer system 120, however, can include any number of logics and/or programs that are managed in accordance with incident response program 122. In general, computer system 120 manages access to incident response program 122, which represents a physical or virtual resource. In some embodiments, incident response program 122 includes certain information and represents code that, when executed, enables computer system 120 to take specific action with respect to another physical resource and/or virtual resource based on, but is not limited to, that certain information. In other words, in such embodiments, incident response program 122 manages, at least, the ability of computer system 120 to take various actions with respect to one or more physical resources and/or virtual resources. In some embodiments, incident response program 122 can also embody any combination of the aforementioned elements. To illustrate various aspects of the present invention, examples of incident response program 122 are presented in which incident response program 122 includes one or more, but is not limited to, a user profile request, a personnel profile, an incident report, a machine learning request, but embodiments of incident response program 122 are not limited thereto. Embodiments of the present invention recognize that incident response program 122 may include other forms of transactions that are known in the art.

In various embodiments of the present invention, a user of client device 130 generates an incident report, utilizing, at least, client application 132. In various embodiments, client application 132 detects that an incident occurs, and an incident ticket is generated. In various embodiments of the present invention, client application 132 communicates the incident ticket to incident response program 122.

In various embodiments, incident response program 122 receives the incident ticket from client application 132. Incident response program 122 analyzes the incident ticket and identifies (i) the type of issue, (ii) the severity level of the issue, and (iii) the required resolution time, wherein the resolution time is associated with the severity level of the issue. The present invention recognizes that the resolution of the incident is made when the total time from reception to resolution of the incident is less than or equal to the required resolution time, and is missed when the total time from reception to resolution is greater than the required resolution time.

In various embodiments of the present invention, incident response program 122 generates an area of analysis by calculating the incident total time to resolution (TTR) and the incident required time to resolution (RTR). Further, in some embodiments, TTR includes the following component parts: (i) receive until assign (RUA) and (ii) assign until resolve (AUR). In various embodiments of the present invention, RUA and AUR can be normalized by the following equations:

$$nRUA = \frac{RUA}{RTR} * 100\%$$

$$nAUR = \frac{AUR}{RTR} * 100\%$$

where, nRUA represents the normalized receive until assign time and nAUR represents the normalized assign until resolve time.

In various embodiments of the present invention, incident response program 122 calculates the normalized values of RUA and AUR. Additionally, incident response program 122 generates a normalized incident report chart (NIPC) depicting various levels of make or miss thresholds in relation to the calculated normalized values of RUA and AUR.

In various embodiment of the present invention, incident response program 122 represents a machine learning algorithm, wherein machine learning is utilized to generate a prediction to classify the incident tickets that are greater than 100% of nRUA and nAUR. In addition, incident response program 122 determines that the incident ticket requests fall into one or more categories that include, but are not limited to, (i) impact (e.g., non-actionable, device unavailable, application disk, etc.), (ii) category (e.g., print, storage, email, workstation, hand-held device, etc.), (iii) geography (e.g., region, country, customer, etc.), (iv) organization (business owner, employee, etc.), and (v) priority (e.g., critical, major, minor, etc.). Embodiments of the present invention recognize that the one or more classifications represent contributing factors and potential solutions to the incident ticket. Additionally, embodiments of the present invention recognize that one or more classifications represent the required personnel/staff and skills necessary to resolve the incident tickets.

In various embodiments, incident response program 122 identifies a plurality of incident tickets and further analyzes the plurality of incident tickets. In some embodiments, incident response program 122 identifies a record of historical incidents that occur over a threshold period of time. One having ordinary skill in the art would understand that a threshold period of time includes, but is not limited to, a record of time illustrating from the beginning of record-keeping up until the present time. Additionally, in some embodiments, incident response program identifies the anticipated resolution time and the actual resolution time for the historical incidents and stores this data on database 144. In various embodiments, the historical incident data is used to train the machine learning of incident response program 122 to learn and determine the most efficient and productive way to assign a set of personnel with an identified skillset to a particular incident ticket.

In various embodiments of the present invention, incident response program 122 identifies one or more sets of personnel. Additionally, incident response program 122 identifies one or more skillsets associated with the one or more sets of personnel that include, but are not limited to, database management and repair, middleware, server management and repair, IT security, etc.

Embodiments of the present invention provide for incident management by receiving a potential issue from an end user or through a monitoring system. In various embodiments each incident ticket is allocated a severity which often defines the RTR (e.g., based on a service level agreement (SLA)). In some embodiments of the process, each incident ticket goes through stages: receive, assign, resolve. The total time from receive to resolve is compared to the RTR and the incident is said to have made the service level if the total time is less than or equal to the required resolution time and missed the service level is the total time is greater than the required resolution time. Analyzing the performance of a skill group in terms of SLA attainment requires the work within a service pool to be divided into two moments of an incoming incident ticket timeline: before and after the ticket assignment to a technician. In various embodiments, the analyzing begins by normalizing the incident tickets' assignment delays and resolution timers by their respective SLA duration and plotting them on a normalized assignment delay resolution time space. In some embodiments, the incident ticket total time is broken into two components (i) RUA (wait) and (ii) AUR (work), where normalizing these times from 0% to 100% and dividing them by the RTR (e.g. SLA) generates a scatter plot of all incidents using a log x-log y transformation (e.g., NIPC).

Embodiments of the present invention provide for an analytical tool, the NIPC, that characterizes the performance and quality of incident management performance in IT service delivery teams. The NIPC allows major issues such as, but not limited to, resource and skill allocation, abnormal behavior, and common cause issues to be diagnosed. Additionally, the method can be used to identify opportunities for automated resolution or assignment of tickets to determines resources and skills needed and to reach a balance between productivity and service quality.

Figure 2:
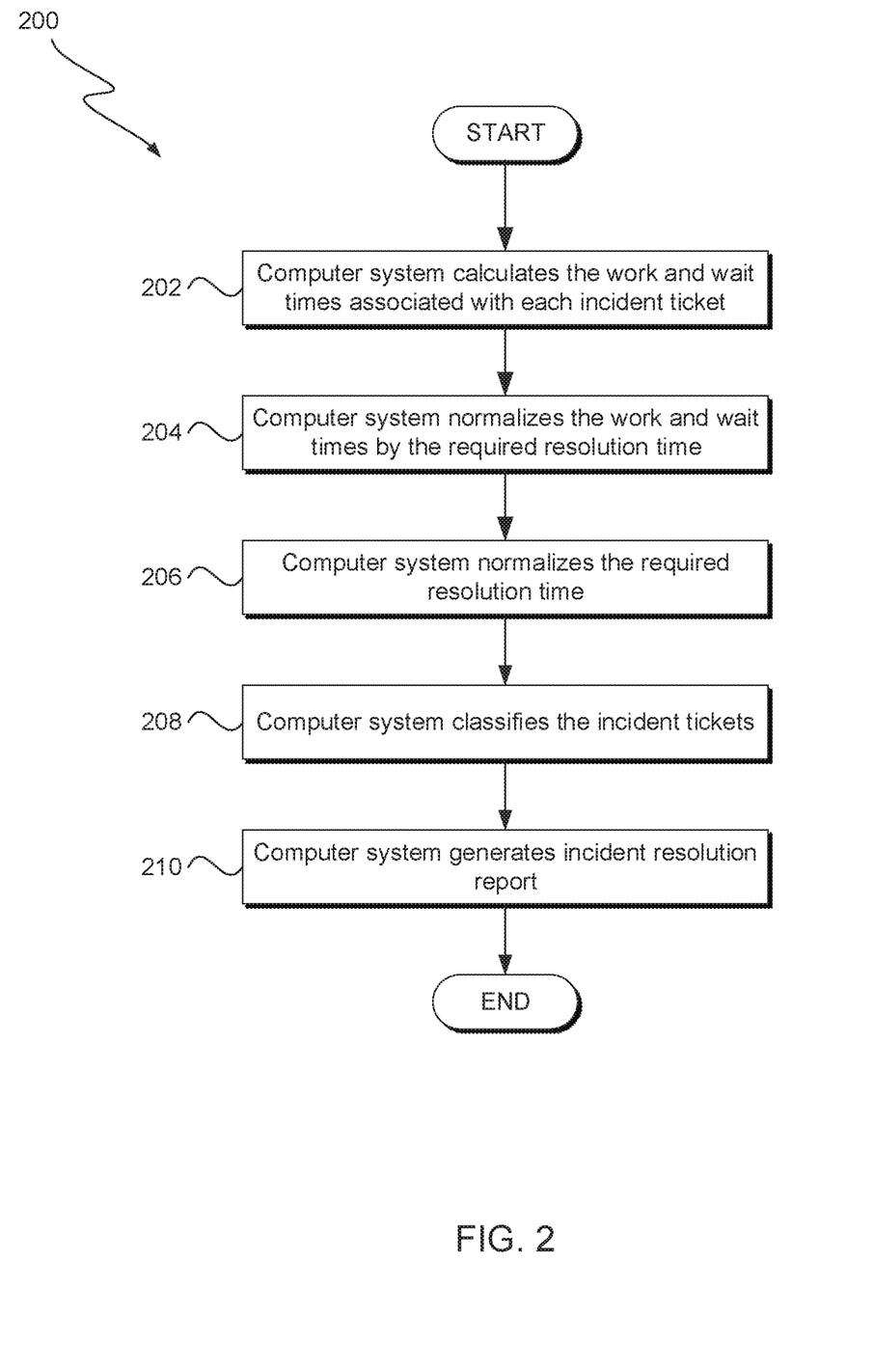
FIG. 2 illustrates operational processes of executing a system for generating an incident resolution report, on a computing device within the environment of FIG. 1, in accordance with an exemplary embodiment of the present invention.

FIG. 2 is a flowchart, 200, depicting operations of incident response program 122 in computing environment 100, in accordance with an illustrative embodiment of the present invention. FIG. 2 also represents certain interactions between incident response program and client application 132. In some embodiments, the operations depicted in FIG. 2 incorporate the output of certain logical operations incident response program 122 executing on computer system 120. It should be appreciated that FIG. 2 provides an illustration of one implementation and does not imply any limitations with regard to the environments in which different embodiments may be implemented. Many modifications to the depicted environment may be made. In one embodiment, the series of operations in FIG. 2 can be performed in any order. In another embodiment, the series of operations, depicted in FIG. 2, can be performed simultaneously. Additionally, the series of operations, depicted in FIG. 2, can be terminated at any operation. In addition to the features previously mentioned, any operations, depicted in FIG. 2, can be resumed at any time.

In operation 202, incident response program 122 receives a plurality of incident tickets from client application 132. In various embodiments, the plurality of incident tickets is generated based on, but not limited to, end user errors, or though a monitoring service that detects technological errors. In response to incident response program 122 receiving the incident ticket requests, incident response program 122 analyzes the incident ticket requests and identifies (i) the issue associated with each incident, (ii) the anticipated resolution time, and (iii) the personnel utilized to resolve the incident request. In various embodiments, the actual resolution time associated with each individual incident report is communicated to incident response program 122 and stored on database 144.

In operation 204, incident response program 122 calculates the total assign time and total resolution time for the plurality of incidents. In various embodiments, incident response program 122 computes the assign time as the time from incident arrival until the incident is assigned to a resolution agent (human or automated). It also calculates total resolution time from the time the incident is assigned until the incident is resolved.

In various embodiments, incident response program 122 calculates the normalized values for RUA and AUR for a wait and work zone, wherein incident response program 122 identifies (i) the skill or requirement issue, (ii) what automation is possible for various incident tickets, (iii) submit various incident tickets to the dispatch/assignment level, (iv) which incident tickets encounter a volume/staffing issue, (v) incident tickets that do not represent a risk, and (vi) which incident tickets represent a good skill/volume mix.

In operation 206, incident response program 122 normalizes the assign and resolution time using the required resolution time (RTR) as described in detail above. In various embodiments, incident response program 122 compares the anticipated resolution time against the actual resolution time for each individual incident ticket. In some embodiments, incident response program 122 determines that a set of incident tickets require a threshold value of time to resolve (e.g., one hour to complete). Embodiments of the present invention recognize that an incident report could take any possible length of time to resolve, and that embodiments are not necessarily limited to given threshold periods of time.

In various embodiments, incident response program 122 normalizes the RTR based on receive until assign (RUA) and assign until receive (AUR) values. Incident response program 122 generates the NIPC scatter plot that represents the service level threshold of the incident tickets.

In various embodiments of the present invention, incident response program 122 represents a machine learning AI algorithm. In some embodiments, incident response program 122 utilizes a set of data to learn and improve from the experience without being explicitly programmed. In some embodiments, incident response program 122 utilizes the set of data to identify patterns that include, but are not limited to, (i) the incident ticket requests, (ii) total time to resolve the incident, (iii) the set of personnel, and (iv) the skillsets of the set of personnel. The present invention recognizes that the machine learning AI algorithm can take the form of a supervised machine learning algorithm, an unsupervised machine learning algorithm, a semi-supervised machine learning algorithm, and a reinforcement machine learning algorithm.

In various embodiments of the present invention, incident response program 122 inputs the classifications of the incident ticket request into a machine learning AI algorithm to learn and determine a set of personnel and a skillset to resolve the incident in a threshold of time less than or equal to the total time to resolve. In some embodiments, incident response program 122 determines a set of personnel and a skillset based on, but not limited to, (i) the issues identified with the incident ticket request, (ii) the classification of the incident, and (iii) the total time to resolve. In various embodiments, incident response program 122 learns from historical data associated with (i) the issues identified with the incident ticket request, (ii) the classification of the incident, and (iii) the total time to resolve, to determine a set of personnel with a skillset to resolve the issue within a threshold period of time less than or equal to the total time to resolve.

In various embodiments, incident response program 122 utilizes a set of data to analyze and learn to improve incident management. In various embodiments, the data includes, but is not limited to, (i) historical incident reports, (ii) the anticipated threshold of time to resolve the incident, (iii) the actual threshold of time to resolve the incident, (iv) the set of personnel assigned to resolve the incident report, and (v) the skillset of the set of personnel. In various embodiments, incident response program 122 analyzes the data to learn how to reduce the total threshold of time to resolve and to assign a set of personnel with a skillset to resolve the incident within the reduced total threshold of time.

In various embodiments of the present invention, incident response program 122 calculates the RTR associated with each individual incident ticket. In various embodiments, incident response program 122 generates a normalized incident profile chart (NIPC) based on, but is not limited to, the calculations of nRUA and nAUR. In various embodiments, incident response program 122 identifies areas that represent the normalized TTR of historical incident reports. In various embodiments, incident response program 122 analyzes the NIPC and identifies portions of the chart that include, but are not limited to, (i) staffing/prioritization issues, (ii) difficult issues to resolve, (iii) prioritization issues, (iv) automation opportunities, and (v) multiple actions required.

In operation 208, incident response program 122 analyzes the incident tickets and classifies the incident tickets based, at least, on the NIPC. In various embodiments, the classifications of the NIPC include, but are not limited to, (i) no risk, (ii) automatic resolution/false alarms, (iii) fast response, (iv) good resources to volume match, (v) good skill to SLA match, (vi) skill or SLA issues, and (vii) resource or volume issues. In various embodiments, incident response program 122 classifies the incident ticket requests based on, but are not limited, to the classifications of the NIPC, as discussed above. In various embodiments, the classifications are based on, at least, the normalized values of the RUA and AUR of the incident tickets.

Embodiments of the present invention further provide for ticket classification of the incident tickets that include, but are not limited to, (i) non-actionable, (ii), process stopped, (iii) disk full, (iv) middleware hung, (v), server unavailable, etc.

Figure 3:
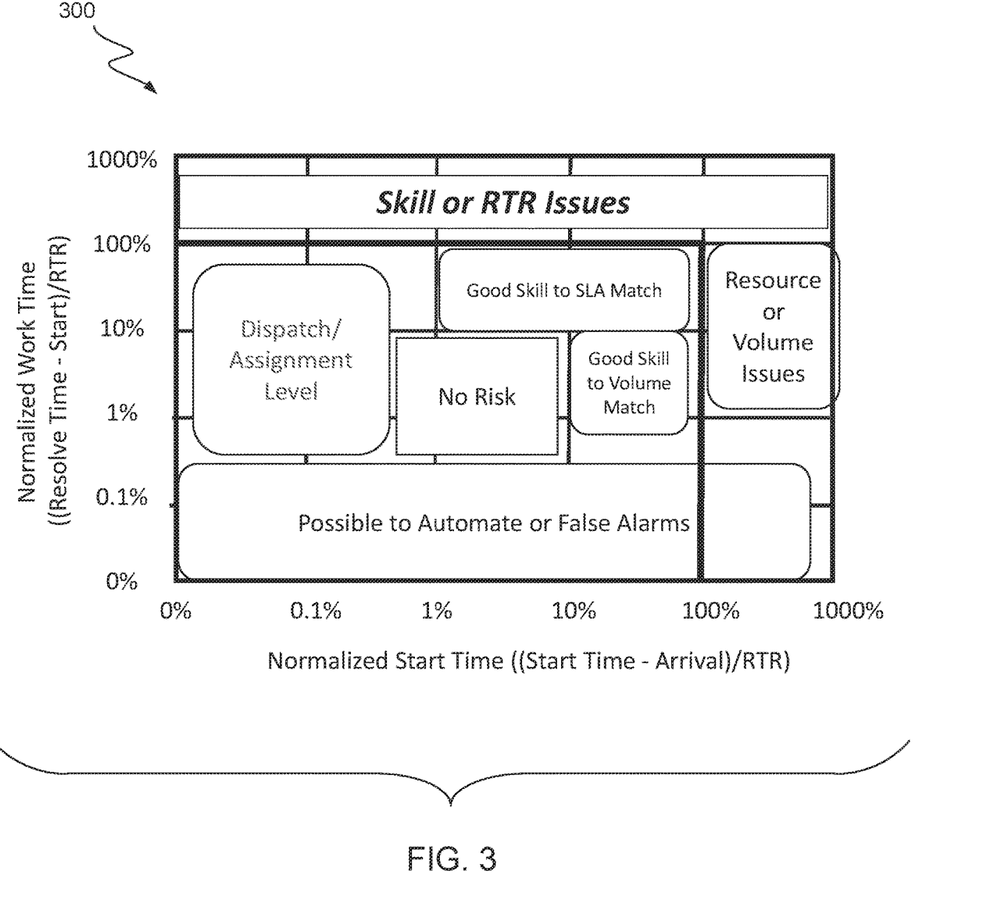
FIG. 3 depicts a normalized incident profile chart according to at least one embodiment of the present invention.

Embodiments of the present invention recognizes that a threshold value above 100% of the nRUA and nAUR axis of the chart indicates a miss threshold in service to the incident tickets. Further, embodiments of the present invention recognize the need to determine incident tickets that fall within the threshold value above 100% of the nAUR axis of the NIPC are classified as skill or SLA issues. Additionally, incident tickets that fall within a threshold value above 100% of the nRUA values are classified resource or volume issues.

In various embodiments, incident tickets that fall within a threshold value above 100% of the nAUR axis of the NIPC represent that the issue requires a set of personnel with a particular skillset to resolve the incident in a threshold period of time less than or equal to the RTR. In various embodiments, incident response program 122 identifies the issue to be resolved and the skillset required. In some embodiments, the skillset includes, but is not limited to, database management and repair, middleware, server management and repair, IT security, etc. In various embodiments, incident response program 122 access database 144 and retrieves data associated with (i) sets of personnel and (ii) the accompanying skillsets.

Embodiments of the present invention recognize that incident response program 122 correlates the set of personnel and the accompanying skillset required to resolve the incident ticket within the RTR. In various embodiments, incident response program 122 analyzes the incident tickets to identify the skillsets to resolve the incident tickets within a threshold period of time equal to or less than the RTR. Additionally, incident response program 122 analyzes data stored on database 144 that represents data regarding the sets of personnel and their accompanying skillsets. In various embodiments, incident response program 122 matches a set of personnel that have the required skillsets to resolve the incident ticket within a threshold period of time equal to or less than the RTR. In response to analyzing the incident ticket, incident response program 122 assigns a set of personnel to the incident ticket to resolve the incident. In various embodiments, incident response program 122 identifies that the incident associated with the incident ticket requires a threshold period of time to complete, and further requires a set of personnel with a particular skillset to resolve the incident.

In various embodiments, incident response program 122 monitors the progression of the resolution of the incident report. In various embodiments, incident response program 122 identifies one or more skillsets utilized by the set of personnel to resolve the incident report. In various embodiments, incident response program 122 stores this data on database 144. In some embodiments of the present invention, incident response program 122 identifies whether the approach to resolve the incident was successful or unsuccessful. Additionally, incident response program 122 identifies which skillsets were utilized during an unsuccessful attempt to resolve the incident report and which skillsets were utilized during a successful attempt to resolve the incident report. In various embodiments, incident response program 122 calculates the threshold period of time spent during the unsuccessful attempts and successful attempts to resolve the incident report. Incident response program 122 stores this data on database 144.

In various embodiments of the present invention, incident response program 122 identifies whether the TTR (i.e., total time to resolve) was missed in response to the set of personnel attempting to resolve the incident report. In some embodiments, the set of personnel includes, but is not limited to, a skillset that provides the set of personnel the ability to resolve the incident report within the TTR (e.g., made the TTR). Alternatively, in some embodiments, the set of personnel does not resolve the incident report within the TTR (e.g., missed the TTR). In various embodiments, incident response program 122 normalizes the TTR, as discussed above, and calculates the normalized TTR values. Incident response program 122 stores this data on database 144.

In operation 210, incident response program 122 generates an incident resolution report. In various embodiments, incident response program 122 generates the incident resolution report that includes, at least, (i) the set of personnel, (ii) the accompanying skillsets, (iii) the required time to resolve the incident ticket, (iv) the ticket class to be resolved identified in the incident ticket, and (v) automation opportunities. In various embodiments, incident response program 122 communicates the incident resolution ticket to the set of personnel required to resolve the incident ticket with program instructions instructing the set of personnel of (i) the issue to be resolved and (ii) the required time to resolve the incident ticket.

FIG. 3 depicts an example of a normalized incident profile chart (NIPC), in accordance with an embodiment of the present invention. In various embodiments, each point on the NIPC represents a single incident ticket for an IT service management team. In various embodiments, the normalized RUA and AUR values of the various incident tickets are indicated by the percentage values on the x and y planes of the NIPC. As shown in FIG. 3, in various embodiments, the NIPC can be sectioned into one or a combination of classifications that include, but are not limited to, (i) no risk, (ii) possible to automate or false alarms, (iii) dispatch/assignment level, (iv) good skill to volume match, (v) good skill to SLA match, (vi) skill or RTR issues, and (vii) resource or volume issues.

In various embodiments, the incident tickets found between the normalized values of (1%-10%, 1%-10%) on the NIPC are indicated as no risk and are quickly assigned by the dispatcher to technicians and resolved by these technicians with a quick threshold period of time. In various embodiments, a high concentration of incident tickets located within the no risk zone indicates that operations are working seamlessly, where most incident tickets are finding technicians with the proper skillsets to work on them and the corresponding issues being resolved without much undue delay.

In various embodiments, the incident tickets found between the normalized values of (0%-1000%, 0%-0.1%) on the NIPC are indicated as possible to automate or false alarms these tickets would be compatible with automatic resolution methods, or tickets easily recognized as false alarms and therefore easily dismissible. In various embodiments, a high concentration of tickets here suggests that the performance of the owner group can be greatly improved by reducing the total number of incident tickets handled by the technicians, either by automating the resolution and closure of the incident tickets or by the usage of better monitoring and filtering methods.

In various embodiments, the incident tickets found between the normalized values of (0%-1%, 0%-1000%) on the NIPC are indicated as dispatch/assignment level. Incident tickets located within these values are incident tickets which are quickly assigned but whose resolution may take some time. In various embodiments, a high concentration of tickets in this region indicate not only the resources are rapidly made available for ticket resolution but also that the dispatching process is immediate, and no need for lengthy diagnosis before assignment. In some embodiments, the tickets in this region are probably candidates for automatic dispatching, possibly using pattern recognition and machine learning methods.

In various embodiments, the incident tickets found between the normalized values of (10%-100%, 1%-100%) on the NIPC are indicated by good resources to volume match. Incident tickets located within these values are incident tickets are not immediately assigned and whose resolution takes some time. Additionally, incident tickets that meet their SLAs (e.g., RTR) belong within the category. In various embodiments, a high concentration of tickets here indicates that resources are not always immediately available, so assignment takes some time, but does not include the SLA attainment. In some embodiments, systems with a high concentration in this category have high levels of resource utilization.

In various embodiments, the incident tickets found between the normalized values of (1%-100%, 10%-100%) on the NIPC are indicated by good skill to SLA match. Incident tickets located within these values are incident tickets which meet their SLA, and incident tickets within this category require a good amount of effort for their resolution and therefore adequate technician skillset matching is often critical. In various embodiments, a high concentration of tickets here indicate that resolution tasks can be time-consuming and that the current time assigned to SLAs cannot be made tighter without adding more skilled resources or advanced automation to the system. In some embodiments, systems with a high concentration in this category are matching the technician with the correct skillset to the incident ticket.

In various embodiments, the incident tickets whose resolution time exceeded the 100% of the SLA time are located on the NIPC are indicated by Skill or RTR issues. For incident tickets located within these values, the resource assigned generally does not have the correct skillset to complete the task on time, or the task requires a resolution time beyond the SLA. In some embodiments, a high concentration of incident tickets located within this category depicts an issue with resource skills issues or a need to renegotiate SLAs.

In various embodiments, the incident tickets whose resolution time takes less than the 100% of the SLA but do not meet their SLA are located within this category. In various embodiments, these incident tickets can be corrected if they are assigned to an individual with the required skillset without much undue delay. In some embodiments, a high concentration of incident tickets in this category often indicates that the IT teams are not appropriately dimensioned or have severe dispatching issues. In some embodiments, these incident tickets can be improved by a ticket dispatching system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned model may include at least five characteristics, at least three service models, and at least four deployment models.

Characteristics are as follows:

On-demand self-service: a cloud consumer can unilaterally provision computing capabilities, such as server-time and network storage, as needed automatically without requiring human interaction with the service's provider.

Broad network access: capabilities are available over a network and accessed through standard mechanisms that promote use by heterogeneous thin or thick client platforms 9 e.g., mobile phones, laptops and PDAs).

Resource pooling: the provider's computing resources are pooled to serve multiple consumer using a multi-tenant model, with different physical and virtual resources dynamically assigned and reassigned according to demand. There is a sense of location independence in that the consumer generally has not control or knowledge over the exact locations of the provided resources but may be able to specify location at a higher level of abstraction (e.g., country, state, or datacenter).

Rapid elasticity: capabilities can be rapidly and elasticity provisioned, in some cases automatically, to quickly scale out and rapidly released to quickly scale in. To the consumer, the capabilities available for provisioning often appear to be unlimited and can be purchased in any quality at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual applications capabilities, with the possible exception of limited user-specific application configuration settings.

Platform as a Service (PaaS): the capability provided to the consumers to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environmental configurations.

Infrastructure as a Service (IaaS): the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or large industry group and is owned by an organization selling cloud services.

Hybrid cloud: the cloud infrastructure is a composition of two or more cloud (private, community or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
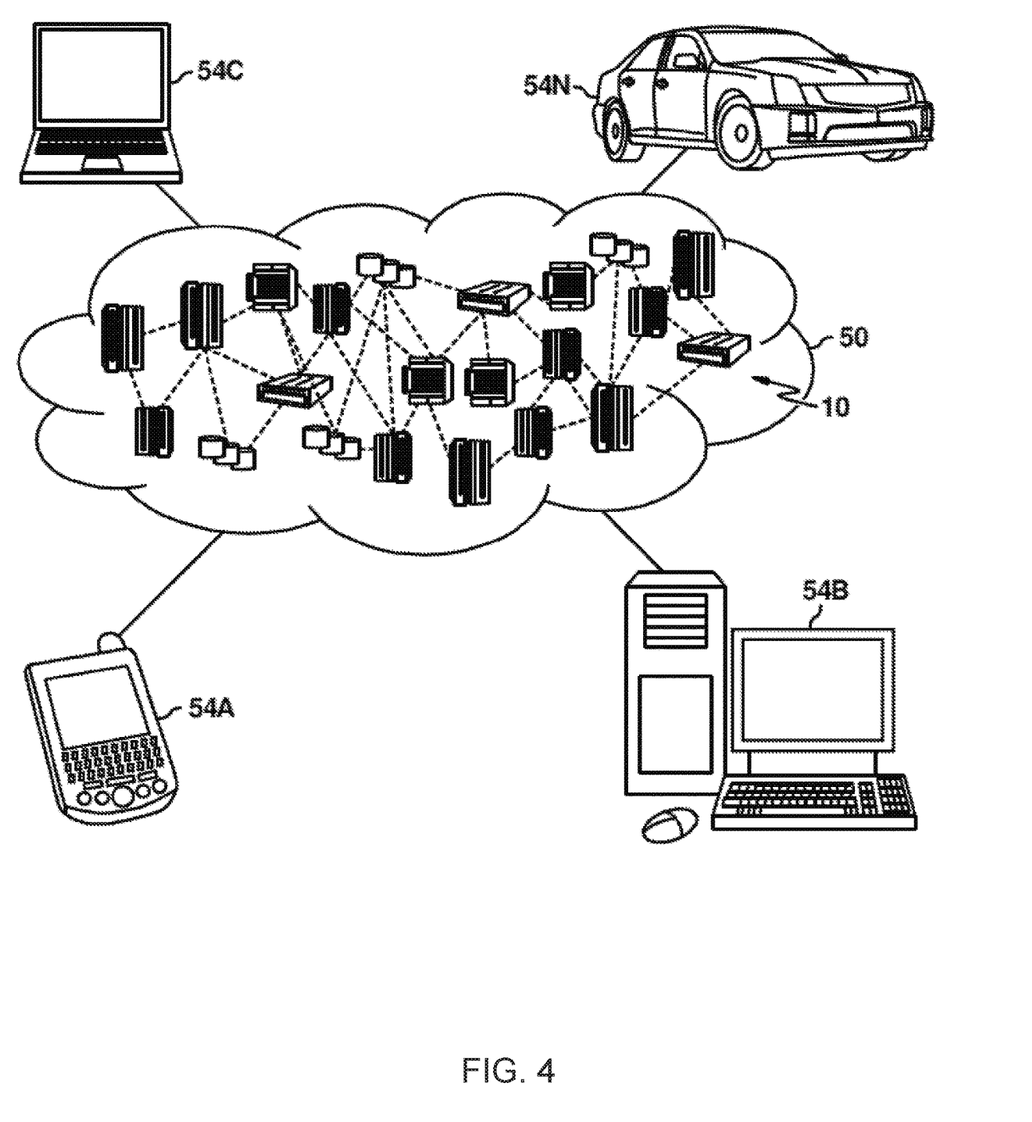
FIG. 4 depicts a cloud computing environment according to at least one embodiment of the present invention.

Referring now to FIG. 4, illustrative cloud computing environment 50 is depicted. As shown, cloud computing environment 50 includes one or more cloud computing nodes 10 with which local computing devices used by cloud consumer: such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
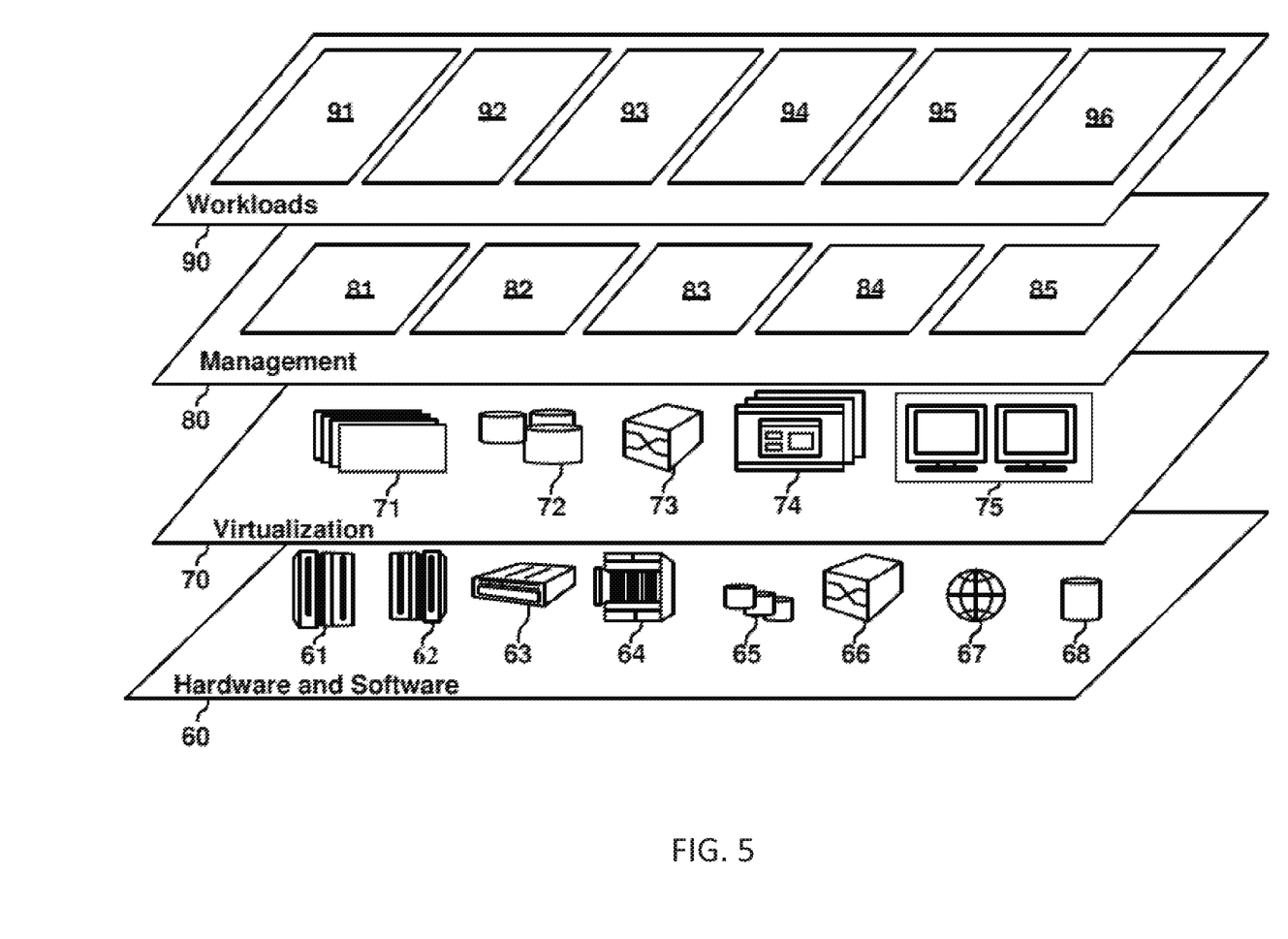
FIG. 5 depicts abstraction model layers according to at least on embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instructions Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73; including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include applications software licenses. Security provides identity verification for cloud consumers and tasks, as well as protection for data and other resources. User portal 81 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 6:
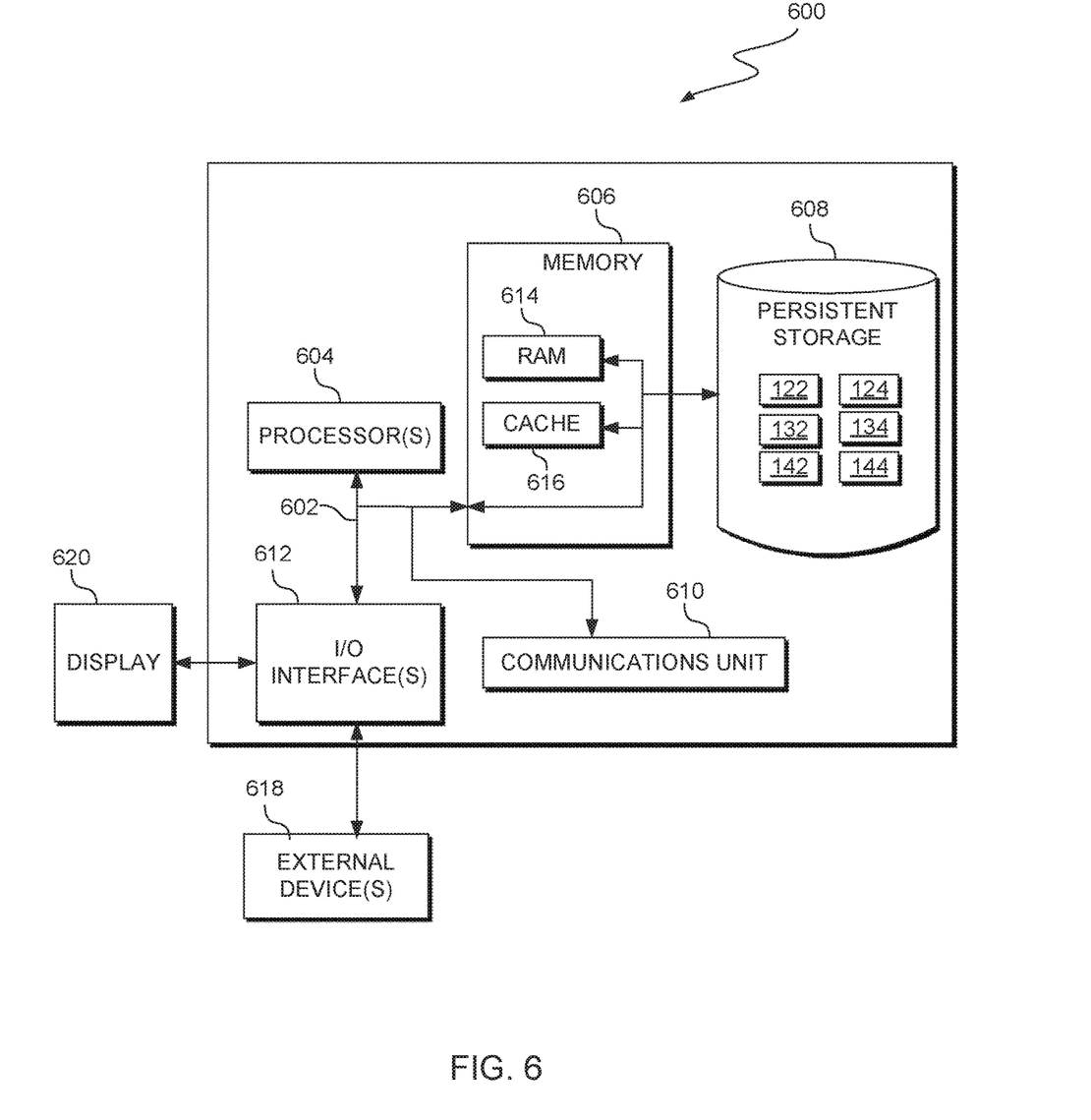
FIG. 6 depicts a block diagram of components of one or more computing devices within the computing environment depicted in FIG. 1, in accordance with an exemplary embodiment of the present invention.

FIG. 6 depicts a block diagram, 600, of components of computer system 120, client device 130, and SAN 140, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer system 120, client device 130, and SAN 140 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Incident response program 122, computer interface 124, client application 132, client interface 134, server application 142, and database 144. are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 110. In these examples, communications unit 610 includes one or more network interface cards. Communications unit 610 may provide communications through the use of either or both physical and wireless communications links. Incident response program 122, computer interface 124, client application 132, client interface 134, server application 142, and database 144 may be downloaded to persistent storage 508 through communications unit 610.

I/O interface(s) 612 allows for input and output of data with other devices that may be connected to computer system 120, client device 130, and SAN 140. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., incident response program 122, computer interface 124, client application 132, client interface 134, server application 142, and database 144, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method, the method comprising:
identifying, by one or more processors, historical data including a set of historical incident reports, wherein the historical incident reports identify: (i) incident tickets, (ii) one or more skills associated with personnel assigned to the incident tickets, and (iii) whether the incident tickets were resolved within threshold periods of time to resolve, the threshold periods of time to resolve including for a historical incident of the historical incident reports an anticipated resolution time and an actual resolution time for the historical incident, wherein the historical data further includes for the historical incident a set of personnel assigned to resolve the historical incident and the existing skillsets of the personnel assigned, the existing skillsets including the assigned personnel's existing range of skills, and wherein the identifying includes identifying, from the set of historical incident reports, anticipated ticket resolution times and corresponding actual ticket resolution times for a plurality of historical incident reports of the set of historical incident reports;
training, by one or more processors, a machine learning model to predict sets of skills associated with resolving incident tickets within the threshold periods of time to resolve, the training being based, at least in part, on the set of historical incident reports, the anticipated ticket resolution times and corresponding actual resolution times for the plurality of historical incident reports of the set of historical incident reports, and the existing skillsets of personnel assigned to the incident tickets in the identified historical data, including the assigned personnel's existing range of skills;
receiving a new incident ticket;
analyzing, by one or more processors, the new incident ticket and identifying a type of issue involved, a severity level of the issue, and a required resolution time for resolving the issue, wherein the required resolution time is associated with the severity level of the issue;
predicting, by one or more processors, using the trained machine learning model, a set of skills associated with resolving the new incident ticket within a threshold period of time to resolve, the predicting, using the trained machine learning model, being based, at least in part, on identifying the type of issue involved, the severity level of the issue, and the required resolution time for resolving the issue; and
assigning, by one or more processors using the machine learning model, a set of personnel to the new incident ticket based, at least in part, on the predicted set of skills associated with resolving the new incident ticket within the threshold period of time to resolve.

2. The computer-implemented method of claim 1, the method further comprising:
generating, by the one or more processors, a new set of inputs for the machine learning model, wherein the new set of inputs includes: (i) the new incident ticket, (ii) the predicted set of skills associated with resolving the new incident ticket within the threshold period of time to resolve, and (iii) an indication of whether the new incident ticket was resolved within the threshold period of time to resolve; and
adjusting, by the one or more processors, the machine learning model based, at least in part, on the new set of inputs.

3. The computer-implemented method of claim 1, the method further comprising:
normalizing, by the one or more processors, the anticipated ticket resolution times and the actual ticket resolution times; and
generating, by the one or more processors, a normalized incident profile chart (NIPC), wherein the normalized incident profile chart includes the normalized anticipated ticket resolution times and the normalized actual ticket resolution times.

4. The computer-implemented method of claim 3, the method further comprising:
classifying, by the one or more processors, the incident tickets associated with the set of historical incident reports into categories based, at least in part, on respective locations of the respective tickets on the normalized incident profile chart.

5. The computer-implemented method of claim 4, wherein the categories include a miss category, wherein tickets in the miss category have actual ticket resolution times that exceed their respective anticipated ticket resolution times.

6. The computer-implemented method of claim 5, wherein the categories further include: (i) a no risk category, (ii) an automatic resolution/false alarm category, (iii) a fast response category, (iv) a good resources to volume match category, (v) a good skills to SLA match category, (vi) a skill or SLA issues category, and (vii) a resource or volume issue category.

7. A computer program product comprising:
one or more computer-readable storage media and program instructions stored on the one or more computer-readable storage media, the stored program instructions comprising:
program instructions to identify historical data including a set of historical incident reports, wherein the historical incident reports identify: (i) incident tickets, (ii) one or more skills associated with personnel assigned to the incident tickets, and (iii) whether the incident tickets were resolved within threshold periods of time to resolve, the threshold periods of time to resolve including for a historical incident of the historical incident reports an anticipated resolution time and an actual resolution time for the historical incident, wherein the historical data further includes for the historical incident a set of personnel assigned to resolve the historical incident and the existing skillsets of the personnel assigned, the existing skillsets including the assigned personnel's existing range of skills, and wherein the identifying includes identifying, from the set of historical incident reports, anticipated ticket resolution times and corresponding actual ticket resolution times for a plurality of historical incident reports of the set of historical incident reports;
program instructions to train a machine learning model to predict sets of skills associated with resolving incident tickets within the threshold periods of time to resolve, the training being based, at least in part, on the set of historical incident reports, the anticipated ticket resolution times and corresponding actual resolution times for the plurality of historical incident reports of the set of historical incident reports, and the existing skillsets of personnel assigned to the incident tickets in the identified historical data, including the assigned personnel's existing range of skills;

receiving a new incident ticket;

analyzing, by one or more processors, the new incident ticket and identifying a type of issue involved, a severity level of the issue, and a required resolution time for resolving the issue, wherein the required resolution time is associated with the severity level of the issue;

program instructions to predict using the trained machine learning model, a set of skills associated with resolving the new incident ticket within a threshold period of time to resolve, the predicting, using the trained machine learning model, being based, at least in part, on identifying the type of issue involved, the severity level of the issue, and the required resolution time for resolving the issue; and program instructions to assign, using the machine learning model, a set of personnel to the new incident ticket based, at least in part, on the predicted set of skills associated with resolving the new incident ticket within the threshold period of time to resolve.

8. The computer program product of claim 7, the stored program instructions further comprising:

program instructions to generate a new set of inputs for the machine learning model, wherein the new set of inputs includes: (i) the new incident ticket, (ii) the predicted set of skills associated with resolving the new incident ticket within the threshold period of time to resolve, and (iii) an indication of whether the new incident ticket was resolved within the threshold period of time to resolve; and program instructions to adjust the machine learning model based, at least in part, on the new set of inputs.

9. The computer program product of claim 7, the stored program instructions further comprising:

program instructions to normalize the anticipated ticket resolution times and the actual ticket resolution times; and program instructions to generate a normalized incident profile chart (NIPC), wherein the normalized incident profile chart includes the normalized anticipated ticket resolution times and the normalized actual ticket resolution times.

10. The computer program product of claim 9, the stored program instructions further comprising:

program instructions to classify the incident tickets associated with the set of historical incident reports into categories based, at least in part, on respective locations of the respective tickets on the normalized incident profile chart.

11. The computer program product of claim 10, wherein the categories include a miss category, wherein tickets in the miss category have actual ticket resolution times that exceed their respective anticipated ticket resolution times.

12. The computer program product of claim 11, wherein the categories further include: (i) a no risk category, (ii) an automatic resolution/false alarm category, (iii) a fast response category, (iv) a good resources to volume match category, (v) a good skills to SLA match category, (vi) a skill or SLA issues category, and (vii) a resource or volume issue category.

13. A computer system, the computer system comprising:
one or more computer processors;
one or more computer readable storage medium; and
program instructions stored on the computer readable storage medium for execution by at least one of the one or more processors, the stored program instructions comprising:

program instructions to identify historical data including a set of historical incident reports, wherein the historical incident reports identify: (i) incident tickets, (ii) one or more skills associated with personnel assigned to the incident tickets, and (iii) whether the incident tickets were resolved within threshold periods of time to resolve, the threshold periods of time to resolve including for a historical incident of the historical incident reports an anticipated resolution time and an actual resolution time for the historical incident, wherein the historical data further includes for the historical incident a set of personnel assigned to resolve the historical incident and the existing skillsets of the personnel assigned, the existing skillsets including the assigned personnel's existing range of skills, and wherein the identifying includes identifying, from the set of historical incident reports, anticipated ticket resolution times and corresponding actual ticket resolution times for a plurality of historical incident reports of the set of historical incident reports;

program instructions to train a machine learning model to predict sets of skills associated with resolving incident tickets within the threshold periods of time to resolve, the training being based, at least in part, on the set of historical incident reports, the anticipated ticket resolution times and corresponding actual resolution times for the plurality of historical incident reports of the set of historical incident reports, and the existing skillsets of personnel assigned to the incident tickets in the identified historical data, including the assigned personnel's existing range of skills;

receiving a new incident ticket;

analyzing, by one or more processors, the new incident ticket and identifying a type of issue involved, a severity level of the issue, and a required resolution time for resolving the issue, wherein the required resolution time is associated with the severity level of the issue;

program instructions to predict using the trained machine learning model, a set of skills associated with resolving the new incident ticket within a threshold period of time to resolve, the predicting, using the trained machine learning model, being based, at least in part, on identifying the type of issue involved, the severity level of the issue, and the required resolution time for resolving the issue; and program instructions to assign, using the machine learning model, a set of personnel to the new incident ticket based, at least in part, on the predicted set of skills associated with resolving the new incident ticket within the threshold period of time to resolve.

14. The computer system of claim 13, the stored program instructions further comprising:

program instructions to generate a new set of inputs for the machine learning model, wherein the new set of inputs includes: (i) the new incident ticket, (ii) the predicted set of skills associated with resolving the new incident ticket within the threshold period of time to resolve, and (iii) an indication of whether the new incident ticket was resolved within the threshold period of time to resolve; and program instructions to adjust the machine learning model based, at least in part, on the new set of inputs.

15. The computer system of claim 13, the stored program instructions further comprising:

program instructions to normalize the anticipated ticket resolution times and the actual ticket resolution times; and program instructions to generate a normalized incident profile chart (NIPC), wherein the normalized incident profile chart includes the normalized anticipated ticket resolution times and the normalized actual ticket resolution times.

16. The computer system of claim 15, the stored program instructions further comprising:
program instructions to classify the incident tickets associated with the set of historical incident reports into categories based, at least in part, on respective locations of the respective tickets on the normalized incident profile chart.

17. The computer system of claim 16, wherein the categories further include: (i) a no risk category, (ii) an automatic resolution/false alarm category, (iii) a fast response category, (iv) a good resources to volume match category, (v) a good skills to SLA match category, (vi) a skill or SLA issues category, and (vii) a resource or volume issue category.

* * * * *